(12) United States Patent
Wu et al.

(10) Patent No.: US 7,085,829 B2
(45) Date of Patent: Aug. 1, 2006

(54) METHOD AND SYSTEM FOR AN INTELLIGENT PROXY SERVER FOR WORKLOAD BALANCING BY WORKLOAD SHIFTING

(75) Inventors: JianMin Wu, San Jose, CA (US); Huang-Ming Pan, San Jose, CA (US)

(73) Assignee: Innomedia, Pte Ltd., The Alpha (SG)

( * ) Notice: Subject to any disclaimer, the term of this patent is extended or adjusted under 35 U.S.C. 154(b) by 857 days.

(21) Appl. No.: 10/036,628

(22) Filed: Dec. 31, 2001

(65) Prior Publication Data

US 2003/0126183 A1 Jul. 3, 2003

(51) Int. Cl.
*G06F 15/173* (2006.01)
*G06F 9/46* (2006.01)

(52) U.S. Cl. .................. 709/223; 718/105; 370/351

(58) Field of Classification Search ............... 718/100, 718/102, 105; 370/351–356
See application file for complete search history.

(56) References Cited

U.S. PATENT DOCUMENTS

| | | | |
|---|---|---|---|
| 5,774,668 A * | 6/1998 | Choquier et al. ........... 709/223 |
| 6,067,545 A * | 5/2000 | Wolff .......................... 707/10 |
| 6,128,279 A * | 10/2000 | O'Neil et al. ............... 370/229 |
| 6,141,341 A | 10/2000 | Jones et al. ................. 370/352 |
| 6,259,691 B1 | 7/2001 | Naudus ....................... 370/352 |
| 6,389,448 B1 * | 5/2002 | Primak et al. .............. 718/105 |
| 6,442,165 B1 * | 8/2002 | Sitaraman et al. ....... 370/395.4 |
| 6,570,855 B1 * | 5/2003 | Kung et al. .................. 370/237 |
| 6,601,084 B1 * | 7/2003 | Bhaskaran et al. ......... 718/105 |
| 6,671,259 B1 * | 12/2003 | He et al. ..................... 370/238 |
| 6,725,253 B1 * | 4/2004 | Okano et al. ............... 709/203 |
| 6,795,867 B1 * | 9/2004 | Ma et al. ..................... 709/240 |
| 6,947,385 B1 * | 9/2005 | Havens ....................... 370/236 |
| 2003/0014526 A1 * | 1/2003 | Pullara et al. .............. 709/227 |
| 2003/0056002 A1 * | 3/2003 | Trethewey .................. 709/238 |
| 2003/0118004 A1 * | 6/2003 | Pan ............................ 370/352 |
| 2003/0118011 A1 * | 6/2003 | Wu ............................. 370/356 |

FOREIGN PATENT DOCUMENTS

| | | |
|---|---|---|
| WO | WO 01/05115 A2 | 1/2001 |
| WO | WO 01/76276 A2 | 10/2001 |

* cited by examiner

*Primary Examiner*—Lewis A. Bullock, Jr.
(74) *Attorney, Agent, or Firm*—Renner, Otto, Boisselle & Sklar, LLP

(57) ABSTRACT

A system and method for providing a Voice-over-Internet Protocol (VoIP) system is disclosed. The VoIP system includes a network including at least two VoIP proxy servers configured to allow voice data to be transmitted and received over the network. The VoIP system also includes at least one VoIP client operatively coupled to the network to transmit and receive voice data over the network wherein the at least one VoIP client connects to one of the at least two VoIP proxy servers which has a lower workload in order to transmit and receive voice data; and a network connection coupled to the at least two VoIP proxy servers for sharing workload data therebetween and the workload data is used to determine which of the at least two VoIP proxy servers the at least one VoIP client connects to in order to transmit and receive voice data.

8 Claims, 5 Drawing Sheets

METHOD AND SYSTEM FOR AN INTELLIGENT PROXY SERVER FOR WORKLOAD BALANCING BY WORKLOAD SHIFTING

TECHNICAL FIELD

The present invention generally relates to Internet Protocol (IP) telephony and, more specifically, relates to a method and system for an intelligent proxy server for workload balancing by workload shifting.

BACKGROUND ART

IP telephony is a collection of technologies that emulates and extends today's circuit-switched telecommunications services to operate on packet-switched data networks based on the Internet Protocol (IP). IP telephony encompasses the terms "Internet Telephony", "voice-over-IP" (VoIP), "video-over-IP", and "fax-over-IP", and extends those capabilities even further to include new telecommunications applications made possible by the convergence of voice, video and data. "Voice-over-IP" (VoIP) technology enables the real-time transmission of voice signals as packetized data over "IP networks" that employ the Transmission Control Protocol (TCP), Real-Time Transport Protocol (RTP), User Datagram Protocol (UDP), and Internet Protocol (IP) suite, for example.

A conventional Public Switched Telephone Network (PSTN) provides its users with dedicated, end-to-end circuit connections for the duration of each call. Based on the calling and called parties' numbers, circuits are reserved among an originating switch, any tandem switches along the route between the two ends of the call, and a terminating switch. Signaling between these PSTN switches supports basic call setup, call management, and call teardown as well as querying of databases to support advanced services such as local number portability, mobile subscriber authentication and roaming, virtual private networking, and toll-free service.

The conventional PSTN has served voice traffic well over the last 100 years, but its success has been paralleled by a rise of separate networks to support data traffic. These separate networks include, for example, the World-Wide Web which is commonly referred to as the Internet, an Intranet, a wide-area network (WAN), a local area network (LAN), an ATM, a T1 network, an E1 network, an Ethernet, a microwave network, a satellite network or the like, or a combination thereof. Clearly, use of distinct networks for voice and data represents an additional burden to service providers and an additional cost to consumers. As more and more PSTN traffic becomes data-oriented, however, the trend toward voice and data network convergence becomes stronger and stronger. Service providers, Internet service providers, and manufacturers of switching, transmission, and customer premises equipment are all participating in a significant shift of the telecommunications industry toward combined voice/video/data networking using IP.

The shift to IP telephony promises better efficiencies in the transport of voice and data, and, as a result, lower telecommunications costs to end users. Moreover, as IP telephony evolves, it will be able to match all the features of voice communications currently supported by the PSTN. Interoperability among the IP telephony products of different vendors is the first major hurdle to overcome. The real promise of IP telephony, however, will be realized with the next wave of advanced services that will begin to surpass the capabilities of the PSTN.

There are, however, some drawbacks associated with existing IP telephony systems. For example, in VoIP systems, most VoIP clients need to connect to a VoIP proxy server in order to complete a call. After the VoIP client connects to a VoIP proxy server, the overall system can provide services for the VoIP client. In conventional systems, the VoIP proxy server is also responsible for tracking the status of each connected VoIP client, on going calls and other services. Therefore, the VoIP proxy server may become overloaded if too many clients attempt to connect to it resulting in a reduction on Quality of Service. Additionally, the workload increases on the designated VoIP proxy server, even though other VoIP proxy servers in the VoIP system may have much lower workloads. This occurs even if the VoIP client connects to VoIP proxy servers connected in a conventional round robin manner. Round robin connection does not guarantee that the workload will be equally distributed among the VoIP proxy servers. In many instances, the VoIP client lacks information on the workload of each VoIP proxy server and is unable to connect to a less loaded VoIP proxy server. In other instances, the VoIP proxy server initially contacted by the VoIP client with a request to connect may lack information on the workload of the other VoIP proxy servers in the VoIP proxy server group and therefore is unable to delegate the request to a VoIP proxy server with a lower workload.

One attempted solution, used by service providers, is to provide a list of available VoIP proxy servers and let the user try and pick a less busy one. This places the burden on the user who must manually select a VoIP proxy server from the list and attempt to connect The user usually lacks information on the workload level of the VoIP proxy servers and relies on "luck" to select a less loaded VoIP proxy server to attempt to connect to.

Another attempted solution is to configure multiple proxy servers to receive a request to connect from a VoIP client. One of the proxy servers is configured as the primary VoIP proxy server. If the VoIP client cannot connect to the primary VoIP proxy server, then the VoIP client transmits a request to a secondary VoIP proxy server. The VoIP client may be configured to attempt to connect to each of the VoIP proxy servers in the VoIP proxy server group in a predefined sequence by directly transmitting the request to connect to each one. This creates additional back and forth traffic between the client and the VoIP proxy servers Therefore, there exists a strong need in the art for a system and method which automatically identifies and utilizes the VoIP proxy server with a lower workload. Such a system and method would provide the identity of the VoIP proxy server to the VoIP client in order to more efficiently complete the call.

SUMMARY OF THE INVENTION

According to one aspect of the invention, the invention is a Voice-over-Internet Protocol (VoIP) system. The VoIP system includes a network including at least two VoIP proxy servers configured to allow voice data to be transmitted and received over the network. The VoIP system also includes at least one VoIP client operatively coupled to the network to transmit and receive voice data over the network; wherein the at least one VoIP client connects to one of the at least two VoIP proxy servers in order to transmit and receive voice data; and a network connection coupled to the at least two VoIP proxy servers for sharing workload data therebetween and the workload data is used to determine which of the at least two VoIP proxy servers the at least one VoIP client connects to in order to transmit and receive voice data.

According to another aspect of the invention, the invention is a method of balancing workload on a Voice-over-Internet Protocol (VoIP) system. The VoIP system includes at least one VoIP client coupled to a network including at least two VoIP proxy servers and a network connection coupled to the at least two VoIP proxy servers for sharing workload data therebetween. The method includes the step of connecting to one of the at least two VoIP proxy servers by the at least one VoIP client in order to transmit and receive voice data. Further, the method includes the steps of sharing workload data between the at least two VoIP proxy servers coupled to a network connection; and determining which of the at least two VoIP proxy servers the at least one VoIP client connects to in order to transmit and receive voice data is based on the workload data.

BRIEF DESCRIPTION OF DRAWINGS

These and further features of the present invention will be apparent with reference to the following description and drawings, wherein.

DISCLOSURE OF INVENTION

Figure 1:
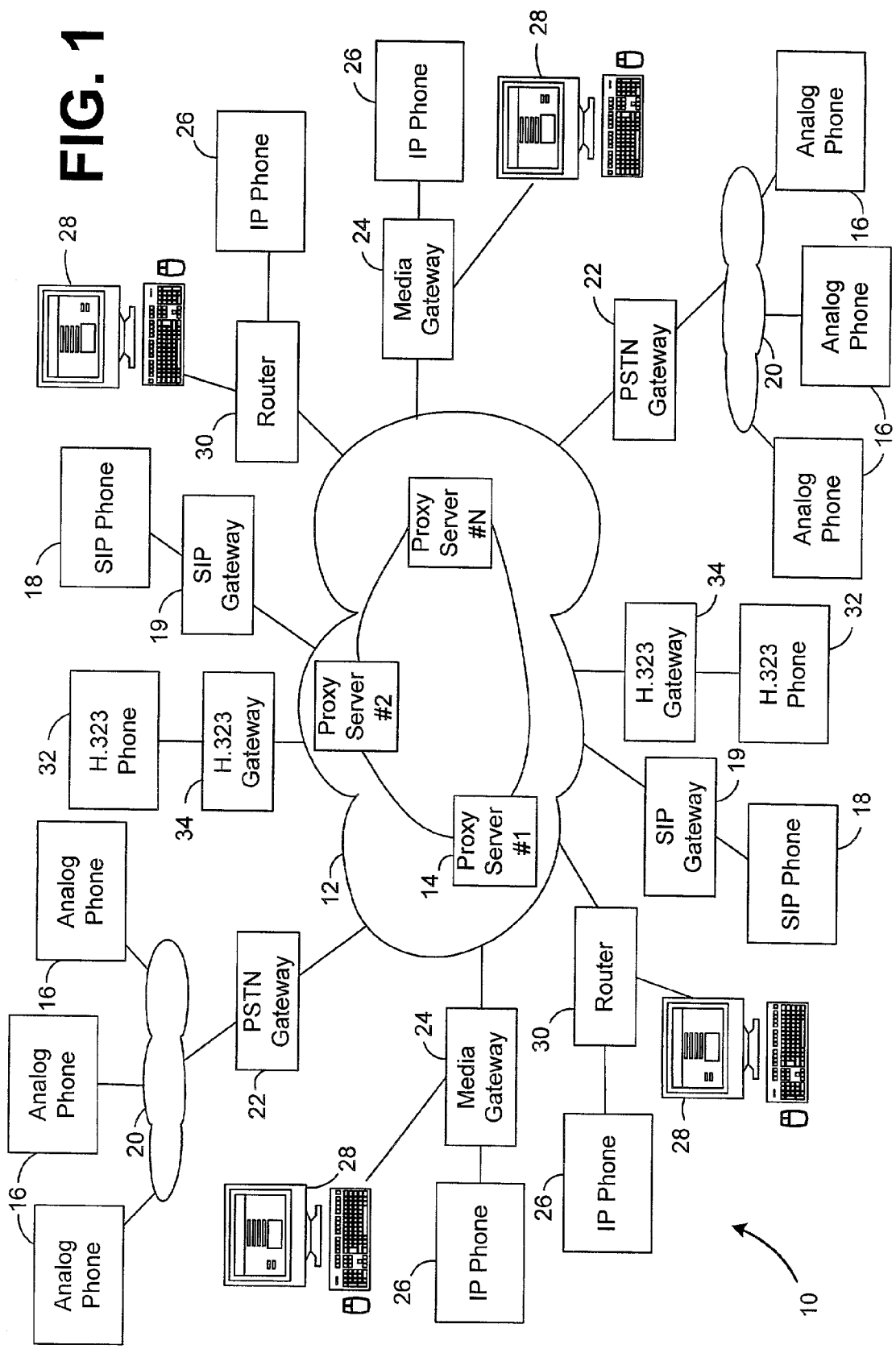
FIG. 1 is a system level diagram of a VoIP system including a plurality of VoIP proxy servers configured to shift workload automatically according to an embodiment of the present invention.

To illustrate the present invention in a clear and concise manner, the drawings may not necessarily be to scale and certain features may be shown in a partial schematic format.

The present invention is a VoIP system including a plurality of VoIP proxy servers configured to balance workload by automatically shifting workload by delegating a request to connect to a VoIP proxy server which has a lower workload if a VoIP proxy server currently processing the request has a workload above a predefined threshold. In one embodiment, a VoIP client initially communicates with a primary VoIP proxy server before connecting to one of the VoIP proxy servers, i.e., the VoIP proxy server with a lower workload and able to handle the call. Further, the invention includes a method for determining and identifying the VoIP proxy server with the lower workload based on workload data collected by the VoIP proxy server currently processing the request. Additionally, the method includes the VoIP proxy server currently processing the request to determine whether its workload is below a predefined workload threshold and is thereby able to handle the call. If the VoIP proxy server currently processing the request determines it is unable to handle the call, the VoIP proxy server currently processing the request determines and identifies another VoIP proxy server having a lower workload and delegates the request thereto. Further, the method includes providing the identity of the VoIP proxy server able to handle the call to the VoIP client so that the VoIP client may connect.

The primary VoIP proxy server is the portal through which the VoIP client connects to gain access to a plurality of VoIP proxy servers in a VoIP proxy server group. When the primary VoIP proxy server receives a client request to connect from a VoIP client wanting to connect to the VoIP system, the primary VoIP proxy server is configured to shift workload automatically by determining whether it is capable of handling the call or whether another VoIP proxy server is at a lower workload and can more efficiently handle the call. If the primary VoIP proxy server is above a predefined threshold, then the primary VoIP proxy server determines and identifies a VoIP proxy server with a lower workload based on workload data shared on a network connection. The primary VoIP proxy server then automatically forwards the client request to connect together with the client's identity to the identified VoIP proxy server that has the lower workload. The VoIP proxy server currently processing the request to connect then determines if its workload is below the predefined threshold. If its workload is below the predefined threshold, then the VoIP proxy server currently processing the request to connect continues the call setup process to handle the call, otherwise it determines and identifies another VoIP proxy server with a lower workload and forwards the request to connect together with the client's identity to the another VoIP proxy server identified. This may be the primary VoIP proxy server or it may be another VoIP proxy server in the VoIP proxy server group. This process of identifying a VoIP proxy server with a lower workload continues until a VoIP proxy server is identified with a lower workload that can also handle the call. In response to the forwarded client request to connect, the VoIP proxy server able to handle the call provides its identity to the VoIP client. The VoIP client then connects to the identified VoIP proxy server and accesses the VoIP system. The VoIP client connects to the identified VoIP proxy server for the duration of the call. Thus, the workload on the VoIP proxy servers is balanced among the VoIP proxy servers.

Referring initially to FIG. 1, an embodiment of a VoIP system, generally designated as 10, is shown. In the VoIP system 10, is a digital data network over which digitized voice signals are transmitted as a stream of packets. The underlying digital data network may be an IP network 12, for example, a proprietary network, a network of leased facilities, the Internet, an Intranet, a WAN, a LAN, a virtual private network (VPN), or the like, or a combination thereof. Within the IP network 12 are a plurality of VoIP proxy servers configured to shift workload automatically for example, proxy servers #1 through #N. The plurality of VoIP proxy servers are coupled together, for example, via conventional network routing or other means known by those with ordinary skill in the art. One of the plurality of VoIP proxy servers is configured as a primary VoIP proxy server 14. The primary VoIP proxy server 14 is the VoIP proxy server designated as the portal through which a VoIP client accesses the VoIP system. The particular process by which a VoIP proxy server is identified to a VoIP client requesting to connect to the VoIP system is transparent to the VoIP client. The operation of the plurality of VoIP proxy, e.g., proxy servers #1 through #N in relation with a transmitting or calling VoIP client and a receiving VoIP client, will be further explained below with reference to FIGS. 2–5. It should be understood that included in the IP network 12 will be other network devices to complete the network such as gateways, routers, switches, etc. (not shown).

A plurality of conventional analog phones 16 may be coupled to the IP network 12 via a local PSTN gateway 22. The plurality of analog phones 16 may be part of a local PSTN 20. Thus, the plurality of analog phones 16 may access the VoIP system 10 locally using known techniques.

Additionally, various "Session Initiation Protocol" (SIP) phones 18 may be coupled to the IP network 12 via a SIP gateway 19, for example. A plurality of IP phones 26 and/or computers 28, for example, may also be coupled to the IP network 12 via various media gateways 24 and/or various routers 30. Additionally, various H.323 phones 32 may be coupled to the IP network 12 via an H.323 gateway 34, for example.

Each computer 28 may have, for example, a pair of speakers and a microphone (not shown) or may have a headset with a microphone (not shown). Alternatively, a computer video camera with a microphone may be coupled to the computer 28 (not shown). The computer 28 may be a personal computer (PC) configured as a multimedia computer, a mobile computing device such as a laptop computer or the like. The computer 28 may execute logic, e.g., software, in order to place a VoIP call.

As will be appreciated, the analog phones 16, the SIP phones 18, the IP phones 26, the computers 28, the H.323 phones 32, etc., via their respective gateways or routers, represent VoIP clients within the VoIP system 10. The VoIP clients are each capable of making and receiving telephone calls via the IP network 12 by transmitting and receiving digital voice data packets therebetween. The actual procedures and protocols for exchanging such data employ conventional VoIP techniques except as otherwise described herein. Thus, the description herein focuses primarily on the inventive aspects.

Next, the general operation of the VoIP system 10 will be described. As previously mentioned, the VoIP system 10 utilizes VoIP technology to allow voice calls to be originated and terminated on various types of platforms over the IP network 12. For example, the analog phones 16 supported by a conventional PSTN can place and receive calls over the IP network 12. Alternatively, a SIP phone 18, an IP phone 26 or a H.323 phone 32 can place a call to an analog phone 16 on a local PSTN. The local PSTN may be in another city, state or country. Further still, a computer 28 could call another computer 28, a SIP phone 18, an IP phone 26, an analog phone 16, a cell phone (not shown), a satellite phone (not shown) or the like, or a combination thereof.

In yet another alternative, any of the aforementioned VoIP clients may place a call to a VoIP proxy server that hosts special services. For example, a VoIP proxy server may host voice mail or video mail. The VoIP client can connect to the VoIP proxy server hosting the special services to retrieve voice or video mail in an otherwise conventional manner.

The VoIP technology translates a destination telephone number into a data network address ("IP address") associated with a corresponding terminating gateway nearest to the destination number. Using an appropriate protocol and packet transmission over the IP network 12, the terminating gateway will transmit the call directly to the VoIP client or initiate a call to the destination phone number over the local PSTN 20 at the receiving destination to completely establish end-to-end two-way communications. Despite the additional connections required, the overall call setup time is not significantly longer than with a call fully supported by a conventional PSTN.

In general, in order to complete a call by accessing the VoIP proxy servers on the IP network 12, a VoIP client establishes a connection with the primary VoIP proxy server 14. Next, the VoIP client requests to connect with the primary VoIP proxy server 14 in order to complete the call. The primary VoIP proxy server 14 determines whether its workload is below a predefined threshold and therefore can handle the call. The particular manner in which the predefined workload threshold is determined can be based on any of a variety of predetermined criteria including, for example, the amount of data being processed per second, the number of clients, the total number of ongoing calls, the number of calls processed per second, the CPU loading percentage, a statistical/mathematical model, or the like. The present invention is not intended to be limited necessarily to any particular criteria for establishing the predefined workload threshold.

If the primary VoIP proxy server 14 is able to handle the call, then the primary VoIP proxy server 14 responds to the client request to connect with its identity, e.g., its IP address. Upon receiving the response, the VoIP client proceeds to connect to the primary VoIP proxy server 14 to complete the call.

However, if the workload of the primary VoIP proxy server 14 is above the predefined threshold, then the primary VoIP proxy server 14 is considered unable to handle the call. In this case, the primary VoIP proxy server 14 determines and identifies a VoIP proxy server with a lower workload based on workload data collected by the primary VoIP proxy server 14 via a network connection 43, e.g., a shared communication bus or channel.

For example, each VoIP proxy server may be configured to collect the workload data from each of the other VoIP proxy servers in the VoIP proxy server group. In one embodiment, each VoIP proxy server via the network connection 43 may pass its workload data spontaneously to each of the other VoIP proxy servers. Alternatively, the VoIP proxy server currently processing the request may poll each of the other VoIP proxy servers for its respective workload data. Further still, each VoIP proxy server may continuously collect the workload data being shared on the network connection 43. The workload information may be provided in a plurality of ways, for example, each VoIP proxy server may receive statistics from the respective VoIP proxy servers as to the current workload at each VoIP proxy server, for example, the amount of data being processed per second, the number of clients, the total number of ongoing calls, the number of calls processed per second, the CPU loading percentage, the result(s) of a statistical/mathematical model, or the like.

Next, the VoIP proxy server currently processing the request identifies which VoIP proxy server has the lower workload. This may be done by comparing the workload data provided to the VoIP proxy server currently processing the request from each of the other VoIP proxy servers, e.g., proxy servers #2 through #N. Alternatively, the VoIP proxy server currently processing the request may initiate a request and await a first response to that request in order to determine and identify which VoIP proxy server currently has the lower workload. In another embodiment, factors unrelated to workload may be used to determine to which VoIP proxy server to delegate the client request to connect. The factors unrelated to workload may include the cost to use a particular VoIP proxy server, the location/region of the VoIP proxy server, the servicing of the VoIP proxy server, the Quality of Service rating, or the like.

The primary VoIP proxy server 14 then automatically forwards the client request to connect together with the VoIP client's identity to the identified VoIP proxy server. The identified VoIP proxy server determines whether its workload is below the predefined threshold, as described above, and therefore can handle the call. The above process of automatically forwarding the VoIP client's request to connect together with the client's identity to a VoIP proxy server with a lower workload continues until the request is received by a VoIP proxy server whose workload is determined to be below the predefined threshold and therefore is capable of handling the call. The VoIP proxy server thus able to handle the call generates and transmits a response including its identity, either directly or by intervening VoIP proxy servers, to the requesting VoIP client. Such identification may be by an IP address, for example. Once the VoIP client receives the response identifying the VoIP proxy server able to handle the call, the VoIP client connects to the VoIP proxy server identified in order to establish the call in an otherwise conventional manner.

Thus, the VoIP client wishing to make a call via the IP network 12 first requests to connect to the primary VoIP proxy server 14. If the primary VoIP proxy server 14 is unable to handle the call, then the primary VoIP proxy server 14 proceeds to delegate the workload. The primary VoIP proxy server 14 forwards the request to connect along with the clients identity to one of the VoIP proxy servers #2 through #N experiencing a lower workload. The primary VoIP proxy server 14 identifies which VoIP proxy server based on workload data passed by all VoIP proxy servers via a network connection 43. The identified VoIP proxy server then determines whether it is able to handle the call. If it is unable to handle the call it determines and identifies another VoIP proxy server with a lower workload to which it delegates the call setup request including the request to connect together with the clients identity. The first VoIP proxy server identified with a lower workload and able to handle call identifies itself to the VoIP client. The VoIP client then establishes the call through that particular VoIP proxy server to complete the call in an otherwise conventional manner.

In this manner, the present invention helps to avoid one or more VoIP proxy servers shouldering the majority of the workload while other of the VoIP proxy servers are underutilized at any given moment in time. This way, more optimum network connections may be established for each call, thereby reducing latency time, etc.

Additionally, the VoIP client only needs to connect initially to the primary VoIP proxy server 14. The automatic workload shifting process takes place within the group of VoIP proxy servers and may be totally transparent to the VoIP client. This reduces the back and forth traffic between the VoIP proxy servers and the VoIP client if the same process was done individually by the VoIP client. Further, the method reduces the need for an additional server (e.g., a load balancing server) or a load monitor device. Further still, the method also reduces the number of server addresses exposed to public. This is a significant help when a service provider needs to relocate or deploy a new VoIP proxy server to the system.

In the VoIP system 10, voice signals are digitized and transmitted as a stream of packets over the IP network 12. The IP network 12 allows each packet to find independently the most efficient path to the intended destination, thereby best using the network resources at any given instant. The packets associated with a single source may thus take many different paths to the destination in traversing the IP network 12, arriving with different end-to-end delays, arriving out of sequence, or possibly not arriving at all. At the destination, however, the packets are re-assembled and converted back into the original voice signal. VoIP technology insures proper reconstruction of the voice signals, compensating for echoes made audible due to the end-to-end delay, for jitter, and for dropped packets, etc.

Figure 2:
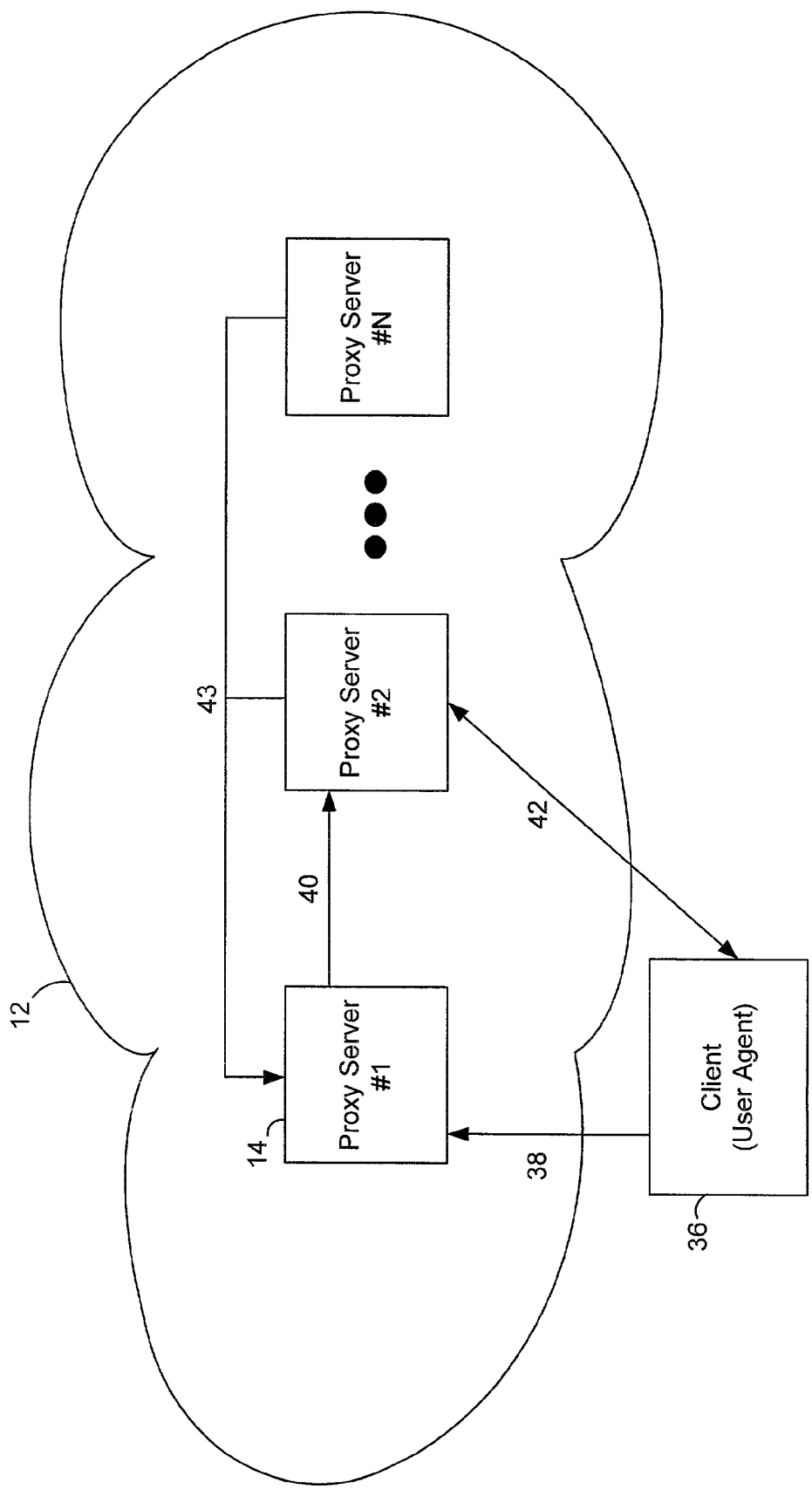
FIG. 2 is a detailed schematic flow diagram representing a VoIP client connecting to the VoIP system using the plurality of VoIP proxy servers configured to shift workload automatically in an embodiment of the present invention.

Turning now to FIG. 2, the IP network 12 is represented with a representative VoIP client 36 (hereinafter client 36) attempting to connect to the primary VoIP proxy server 14 in order to complete a VoIP call in accordance with the invention. Additionally, a network connection line 43 represents the coupling of all the VoIP proxy servers to each other in order for each VoIP proxy server to share its workload data with all the other VoIP proxy servers in the VoIP proxy server group.

It should be understood that the client 36 may be any device capable of transmitting and receiving voice or video data over a VoIP system 10. For example, the client 36 may take the form of one of the analog phones 16, the SIP phones 18, the IP phones 26, the computers 28, etc., which connect to the IP network 12 via its respective gateway or router. The steps of the call connection process will now be further explained with reference to FIGS. 3–5.

Figure 3:
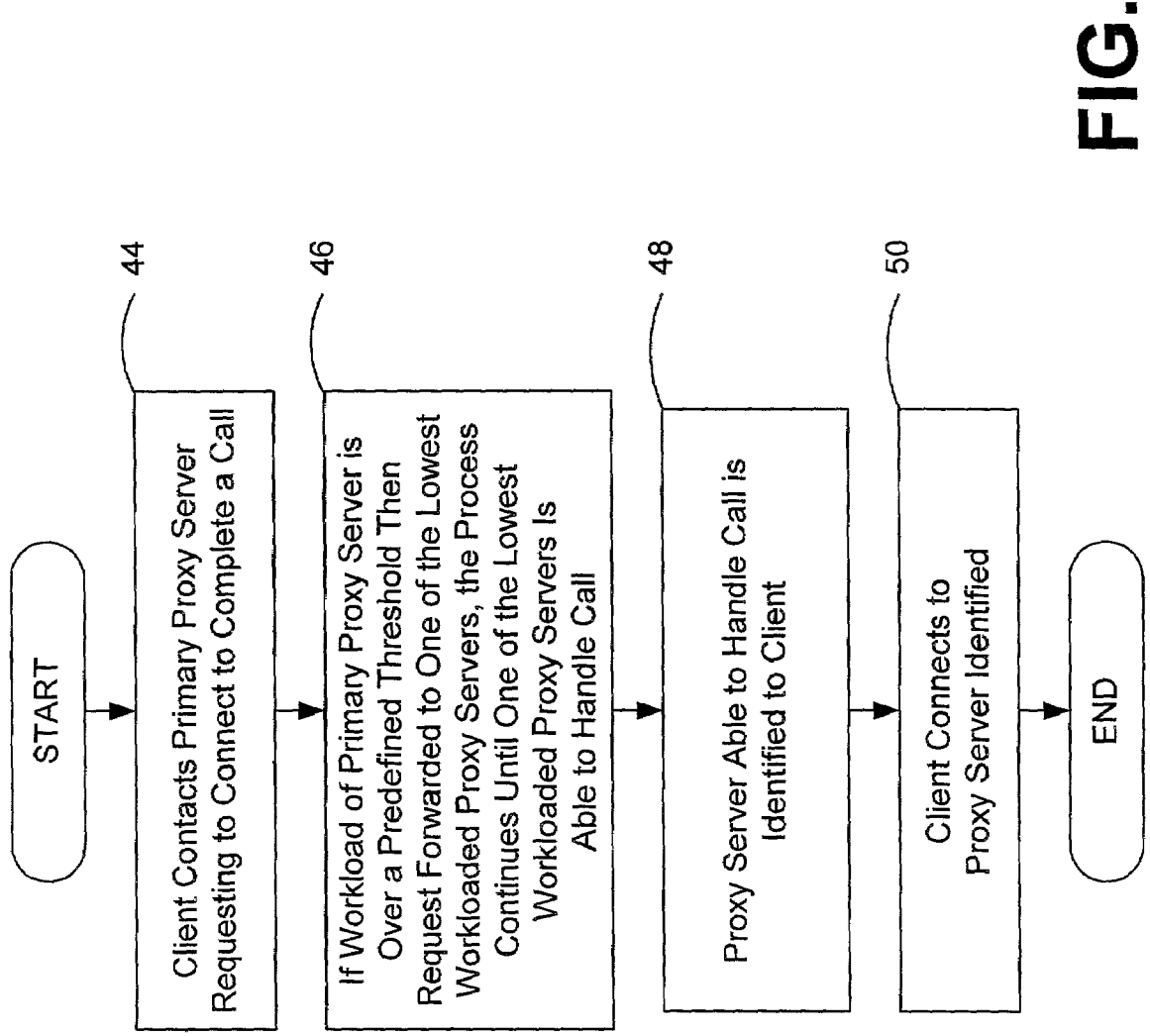
FIG. 3 is a flow diagram of a method for employing the plurality of VoIP proxy servers configured to shift workload automatically according to the present invention.

Referring now to FIG. 3, the overall process is shown for identifying a VoIP proxy server in the VoIP system 10 in accordance with the present invention. In step 44, the primary VoIP proxy server 14 receives a client request to connect from client 36 requesting to connect to the primary VoIP proxy server 14 in order to place a VoIP call. The client request to connect is represented by network connection line 38 in FIG. 2.

Next in step 46, the primary VoIP proxy server 14 determines whether its workload is below a predefined threshold and therefore can handle the call. If the primary VoIP proxy server 14 is able to handle the call, then the primary VoIP proxy server 14 responds to the client request to connect with its identity. Upon receiving the response, the client 36 proceeds to connect to the primary VoIP proxy server 14 to complete the call. The particular manner in which the predefined workload threshold is determined can be based on any of a variety of predetermined criteria including, for example, the amount of data being processed per second, the number of clients, the total number of ongoing calls, the number of calls processed per second, the CPU loading percentage, a statistical/mathematical model, or the like. The present invention is not intended to be limited necessarily to any particular criteria for establishing the predefined workload threshold.

However, if the workload of the primary VoIP proxy server 14 is above the predefined threshold, then the primary VoIP proxy server 14 considers itself unable to handle the call. In this instance, the primary VoIP proxy server 14 is configured to determine and identify a VoIP proxy server with a lower workload based on workload data collected by the primary VoIP proxy server 14.

For example, each VoIP proxy server may be configured to collect the workload data from each of the other VoIP proxy servers in the VoIP proxy server group. In one embodiment, each VoIP proxy servers via the network connection 43 may pass its workload data spontaneously to each of the other VoIP proxy servers. Alternatively, the VoIP proxy server currently processing the request may poll each of the other VoIP proxy servers for its respective workload data. Further still, each VoIP proxy server may continuously collect the workload data being shared on the network connection 43. The workload information may be provided in a plurality ways, for example, each VoIP proxy server may receive statistics from the respective VoIP proxy servers as to the current workload at each VoIP proxy server, for example, the amount of data being processed per second, the number of clients, the total number of ongoing calls, the number of calls processed per second, the CPU loading percentage, the result(s) of a statistical/mathematical model, or the like.

Next, the VoIP proxy server currently processing the request identifies which VoIP proxy server has the lower workload. This may be done by comparing the workload data provided to the VoIP proxy server currently processing the request from each of the other VoIP proxy servers, e.g., proxy servers #2 through #N. Alternatively, the VoIP proxy server currently processing the request may initiate a request and await a first response to that request in order to determine and identify which VoIP proxy server currently has the lower workload. The particular manner in which the lower workload is determined can be based on any of a variety of predetermined criteria. The present invention is not intended to be limited necessarily to any particular criteria for establishing the lower workload.

The primary VoIP proxy server 14 then automatically forwards the client request to connect and the VoIP client's identity to the identified VoIP proxy server. The identified VoIP proxy server determines whether its workload is below the predefined threshold and therefore is able to handle the call. If the workload of the identified VoIP proxy server is above the predefined threshold, then the identified VoIP proxy server considers itself unable to handle the call. The identified VoIP proxy server is also configured to forward the client request to connect and the client identity automatically to another identified VoIP proxy server based on workload data collected by the VoIP proxy server currently processing the request to connect. Upon receiving the request to connect together with the client's identity, this VoIP proxy server becomes the VoIP proxy server currently processing the request to connect. If this VoIP proxy server determines its workload is below the predefined threshold and therefore is able to handle the call, then it proceeds to identify itself to the VoIP client.

For this example, the VoIP proxy server, i.e., proxy server #2 is identified as having a lower workload and it determined it was able to handle the call. The forwarding of the request to connect by the primary VoIP proxy server 14 to the identified VoIP proxy server that has the lower workload, i.e., proxy server #2, is represented by network connection line 40 in FIG. 2. It should be understood the above process of automatically forwarding the client request to connect together with the client's identity to a VoIP proxy server with a lower workload may continue until the workload of a VoIP proxy server is determined to be below the predefined threshold and therefore, the VoIP proxy server is capable of handling the call.

Next in step 48, the proxy server #2 then generates and transmits a response to the request to connect directly to the VoIP proxy client. The identity of the VoIP proxy server able to handle the call may be transmitted directly to the client 36 or through a reverse order of the VoIP proxy servers which forwarded the client request to connect. The identity of the VoIP proxy server may be, for example, an IP address or the like which the VoIP proxy server provides to the client 36.

Next in step 50, the client 36 connects using known network protocols, etc., to the VoIP proxy server identified as able to handle the call in order to complete the VoIP call in an otherwise conventional fashion. In FIG. 2, VoIP proxy server #2 represents the VoIP proxy server identified as having the workload below the predefined threshold. The connection of client 36 to the VoIP proxy server #2 is represented by network connection line 42 in FIG. 2.

Now referring to FIG. 4, the specific steps carried out by the plurality of VoIP proxy servers configured to shift workload automatically for identifying the VoIP proxy server able to handle a call, e.g., the first VoIP proxy server with a workload below the predefined threshold will be described. In step 52, the primary VoIP proxy server 14 is configured to wait for a client request to connect to be received from the client 36 before determining its workload level.

Next in step 52, the primary VoIP proxy server 14 determines whether it has received a client request to connect to the primary VoIP proxy server 14. If "no", then the primary VoIP proxy server 14 returns to step 52 to continue to wait for a client request to connect. The return to step 52 is represented by line 56. However, if the answer is "yes", then the primary VoIP proxy server 14 proceeds to determine its ability to handle a call in step 58.

In step 58, the primary VoIP proxy server 14 determines whether its workload is below a predefined threshold and therefore can handle the call. The particular manner in which the predefined workload threshold is determined can be based on any of a variety of predetermined criteria including, for example, the amount of data being processed per second, the number of clients, the total number of ongoing calls, the number of calls processed per second, the CPU loading percentage, a statistical/mathematical model, or the like. The present invention is not intended to be limited necessarily to any particular criteria for establishing the predefined workload threshold.

If the answer is "no", the primary VoIP proxy server 14 is not over the predefined threshold and the primary VoIP proxy server 14 continues to complete the call setup process by proceeding to step 60. In step 60, the primary VoIP proxy server 14 responds to the client request to connect with its identity, its IP address, for example. Upon receiving the response, the client 36 proceeds to connect to the primary VoIP proxy server 14 to complete the call in an otherwise conventional manner. However, if the answer is "yes", the primary VoIP proxy server 14, i.e., server #1, is over a predefined threshold of workload and the process proceeds to step 62.

In step 62, since the workload of the primary VoIP proxy server 14 is over the predefined threshold, the primary VoIP proxy server 14 forwards the client request to connect together with the client's identity to a VoIP proxy server having one of the lowest workloads, as described above. The forwarding of the client request to connect together with the client's identity to the VoIP proxy server which has the lower workload and able to handle the call, i.e., server #2, is represented by network connection line 40 in FIG. 2.

Next in step 64, the VoIP proxy server which has the lower workload, i.e., server #2, determines whether its workload is below a predefined threshold, as described above, and therefore can handle the call. If the VoIP proxy server which has the lower workload, i.e., server #2, is also overloaded, the VoIP proxy server returns to step 62 and forwards the client request to connect together with the client's identity to another VoIP proxy server identified as having a lower workload, e.g., server #N. The forwarding of the client request to connect together with the client's identity to another VoIP proxy server which has the lower workload, i.e., server #N, is not represented in FIG. 2.

The process continuously loops through steps 62 and 64 until a VoIP proxy server which has a workload below the predefined threshold and therefore able to handle the call is identified, i.e., the answer is "no" in step 64. In the example illustrated in FIG. 2, proxy server #2 is identified as having the bandwidth to handle the call.

Next in step 66, the VoIP proxy server which has the lower workload, e.g., proxy server #2, responds to the client request to connect with a response to the client 36. The response provides its identity as the VoIP proxy server able to handle the call, i.e., having a workload below the predefined threshold. The identity of the VoIP proxy server may be, for example, an IP address.

Next in step 68, the client 36 connects to the VoIP proxy server identified as able to handle the call, i.e., having the workload below the predefined threshold using known network protocols, etc. For example, in FIG. 2, VoIP proxy server #2 represents the VoIP proxy server identified as having the workload below the predefined threshold. The response by the VoIP proxy server identified, i.e., proxy server #2, to the client 36 and the continued connection for the duration of the call in an otherwise conventional manner is represented by network connection line 42 in FIG. 2.

Now referring to FIG. 5, the steps carried out by the client 36 making the call and requesting to connect to the primary VoIP proxy server 14 will be described. In step 70, a user of the VoIP system 10 initiates a call on the VoIP system via a VoIP client (e.g., the analog phones 16, the SIP phones 18, the IP phones 26, etc.). The user may, for example, pick up the receiver of the IP phone 26. Alternatively, the user may execute a VoIP program on the VoIP compatible computer 28. Further still, the user may pick up a receiver of the analog phone 16.

In step 72, the client 36 transmits the client request to connect to the primary VoIP proxy server 14 (represented by network connection line 38 in FIG. 2). As previously described, such client request to connect asks the primary VoIP proxy server 14 to connect in order to make a call.

Next in step 74, the client 36 receives a packet from the VoIP proxy server identified as having a lower workload and determined to be able to handle the call containing the response to the client request to connect including the identity of itself as of the VoIP proxy server able to handle the call. In step 76, the client 36 then proceeds to connect with the identified VoIP proxy server as represented by line 42 (FIG. 2) in order to establish the call in an otherwise conventional manner.

It will further be appreciated that the VoIP system 10 may alternatively have configurations other than the configurations shown in FIG. 1. Thus, there has been disclosed a system and method of workload balancing by automatically shifting the workload to the VoIP proxy server able to handle a call, and providing such identity to a VoIP client so the VoIP client may connect to the VoIP system 10 in order to make a VoIP call. This method permits the more efficient use of the VoIP proxy servers by balancing the workload among the VoIP proxy servers more efficiently.

Figure 4:
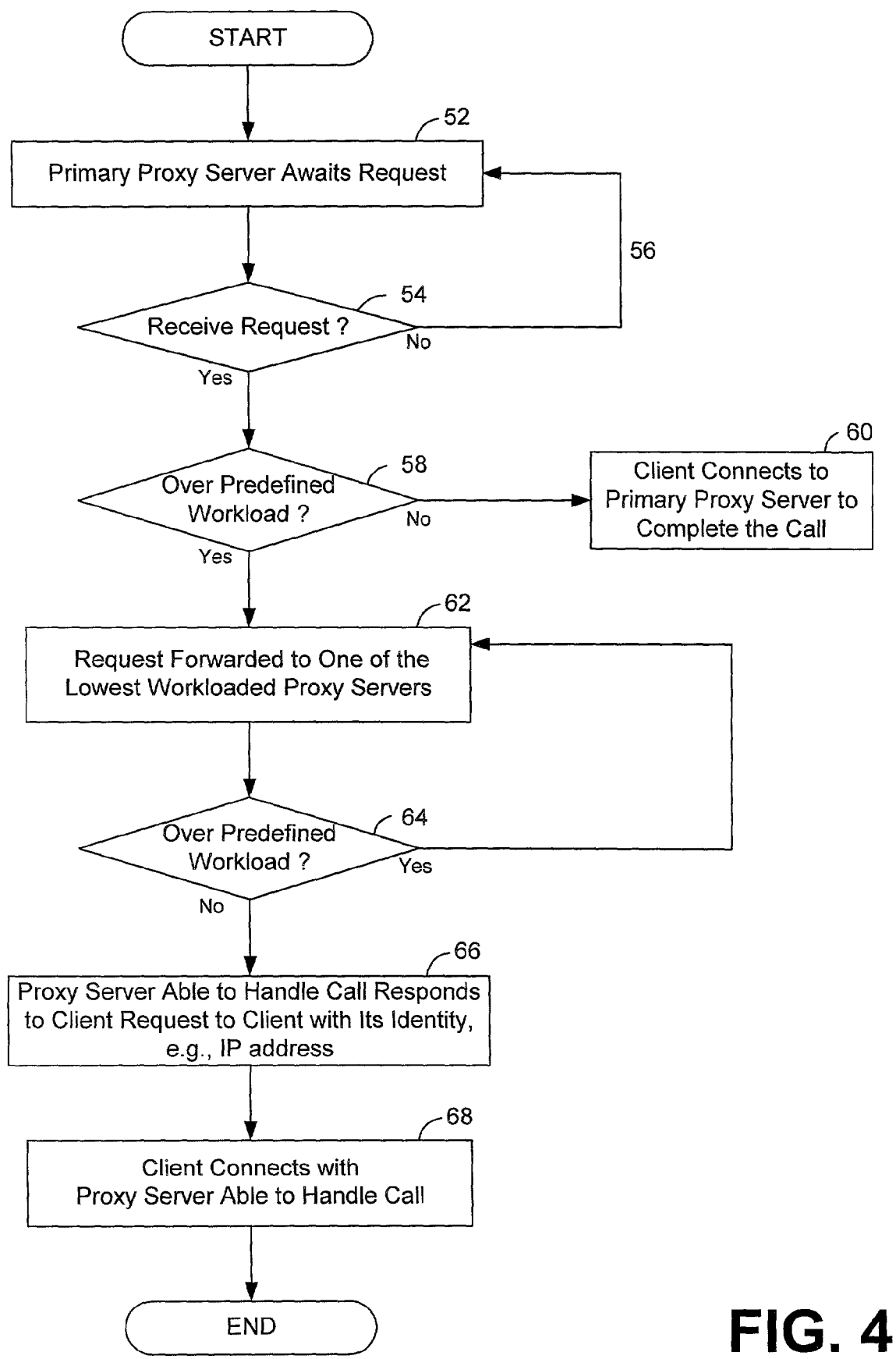
FIG. 4 is a flow diagram of a method for automatically identifying the VoIP proxy server with a lower workload according to an embodiment of the present invention.
Figure 5:
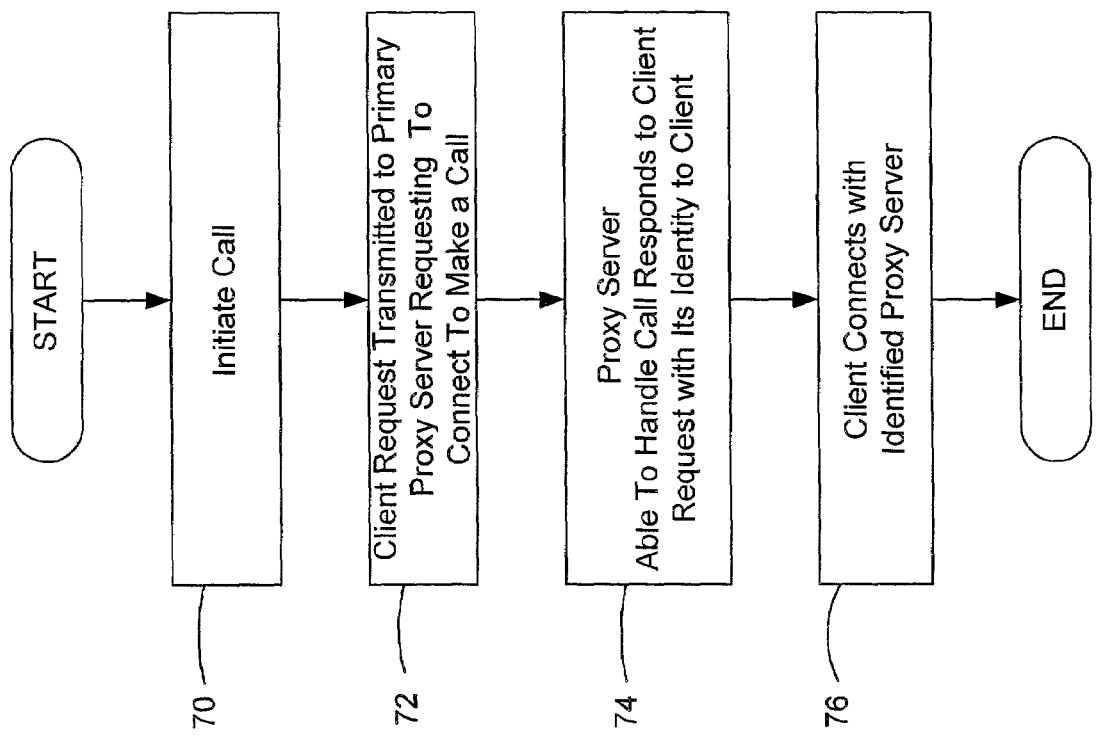
FIG. 5 is a flow diagram of a method for requesting the plurality of VoIP proxy servers configured to shift workload automatically to connect to a VoIP proxy server with a lower workload according an embodiment of the present invention.

Additionally, although the flow charts of FIGS. 3–5 show a specific order of execution, it is understood that the order of execution may differ from that which is depicted. For example, the order of execution of two or more blocks may be scrambled relative to the order shown. Also, two or more blocks shown in succession in FIGS. 3–5 may be executed concurrently or with partial concurrence.

It will further be appreciated that each of the respective devices described herein is programmed via conventional computer programming techniques to execute machine-readable code in order to carry out the operations described herein. Such programming may be easily performed by those having ordinary skill in the art of computer programming and IP technology based on the disclosure herein. Accordingly, the particular details of such programming code have been omitted for the sake of brevity.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method for balancing workload in a Voice-over-Internet Protocol (VoIP) system that has at least one VoIP client and plural VoIP proxy servers that share workload data therebetween, one of the VoIP proxy servers being a primary VoIP proxy server for the VoIP client, comprising:
   a) the primary VoIP proxy server receiving a call connection request from the VoIP client;
   b) the primary VoIP proxy server determining if the primary VoIP proxy server has a workload exceeding a predefined threshold and, if not the primary VoIP proxy server connecting with the client to complete the call, else:
      i) selecting a delegate VoIP proxy server using the sharing workload data, the delegate VoIP proxy server having a lower workload than at least one other of the plural VoIP proxy servers; and
      ii) forwarding the request to the selected delegate VoIP proxy server; and
   c) the delegate VoIP proxy server carrying out b) in place of the primary VoIP proxy server until one of the plural VoIP proxy servers connects with the client to complete the call, the connecting by the delegate VoIP proxy server including transmitting the identity of the delegate VoIP proxy server to the VoIP client.

2. The method according to claim 1, wherein the VoIP proxy servers share workload data by spontaneously passing the workload data to each other.

3. The method according to claim 1, wherein the VoIP proxy server processing the request in b) polls the other VoIP proxy servers for workload data.

4. The method according to claim 1, wherein each VoIP proxy server continuously collects workload data from each other VoIP proxy server.

5. The method according to claim 1, wherein the call connection request and the connection between VoIP client and VoIP proxy server are not managed by a dedicated load balancing server.

6. The method according to claim 1, wherein the identity of the delegate VoIP proxy server connecting with the VoIP client is transmitted from the delegate VoIP proxy server to the VoIP client in a logically direct manner.

7. The method according to claim 1, wherein the identity of the delegate VoIP proxy server connecting with the VoIP client is transmitted from the delegate VoIP proxy server to the VoIP client through a reverse order of the VoIP proxy server or servers that forwarded the request.

8. The method according to claim 1, further comprising exchanging voice and video data between the VoIP client and the connected VoIP proxy server.

* * * * *